United States Patent Office 3,541,728
Patented Nov. 24, 1970

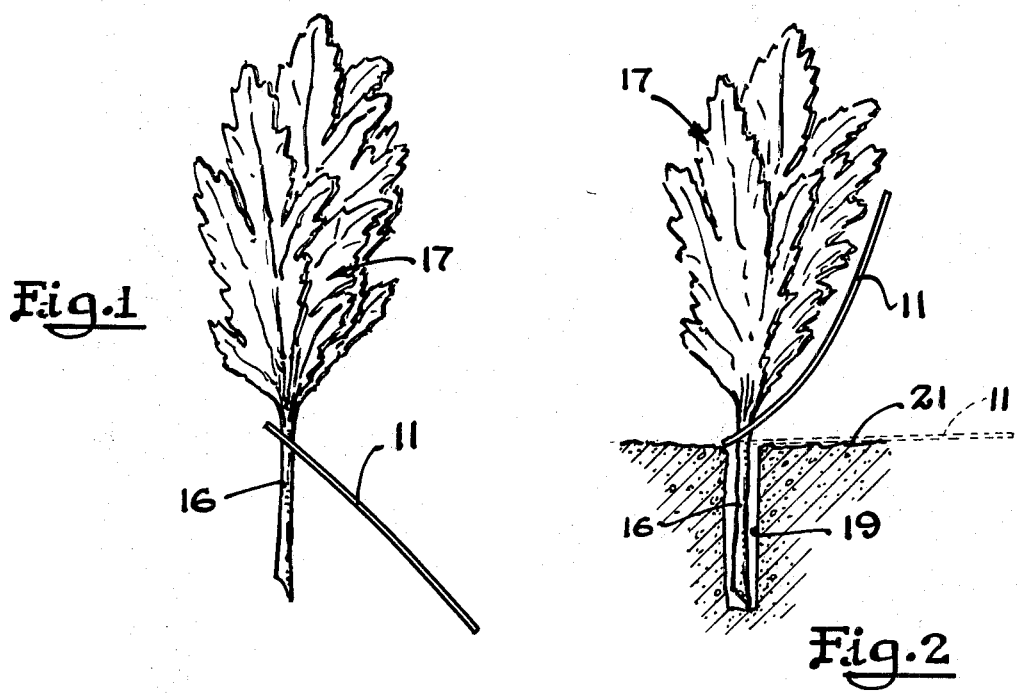
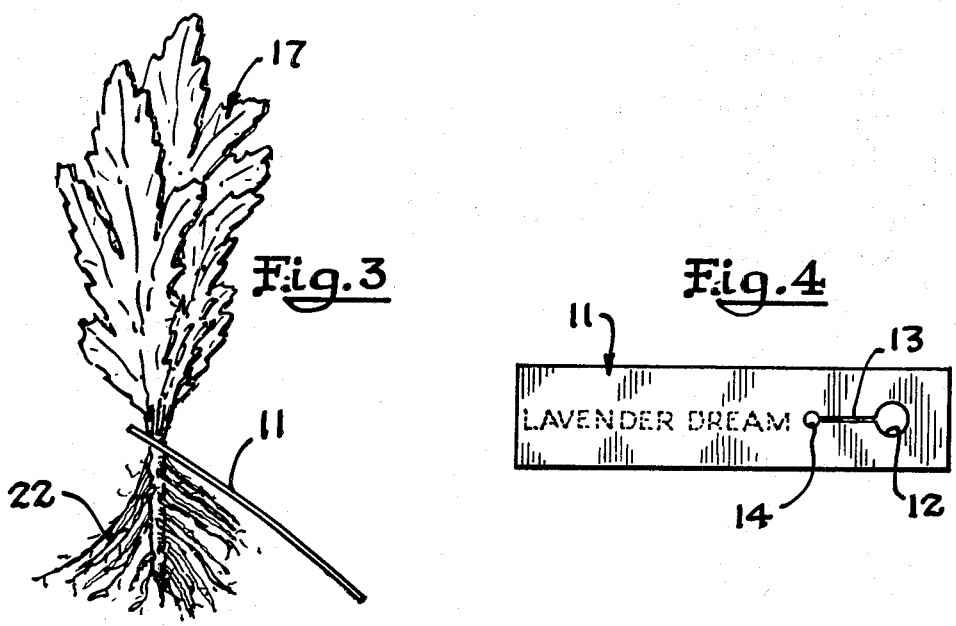

3,541,728
METHOD OF IDENTIFYING CUTTINGS IN CONNECTION WITH ROOTING
Gerald W. Thon and Arthur L. Thon, Arlington Heights, Ill. (both of 4815 Oak St., Crystal Lake, Ill. 60014)
Filed Feb. 28, 1968, Ser. No. 709,012
Int. Cl. G09f 3/18; A01g 1/00
U.S. Cl. 47—58          5 Claims

ABSTRACT OF THE DISCLOSURE

A cutting is slipped through a slit-extended hole in a tag showing the variety of the cutting, the hole having a diameter close enough to that of the stem of the cutting to come to rest thereon in an angle not over approximately 50 degrees from the horizontal, so that falling off during handling in planting is unlikely. The cutting is planted in rooting soil (a term used to include media other than soil) with the tag on top of the soil. When the plant is lifted, after the rooms have grown, the tag is reliably retained by the roots. To withstand the horticulturists' practice of misting plants every few minutes, this tag is wetproof both as to durability (including nonabsorption to maintain full strength), and as to resisting cementation to another tag. The slit extends lengthwise of the tag and is rounded at its end to resist further tearing of the tag.

INTRODUCTION

Numerous expedients have been tried for identifying cuttings as to their variety but so far as known, all efforts prior to the present invention have failed to produce full reliability because of danger of falling off or being torn off during handling. In spite of its simple nature, the present invention has only been reached after some years of experimentation, including some large scale but disappointing tests conducted in the course of applicant's business. In some early efforts, the tags fell off too frequently in initial handling. In some instances, tags upon becoming soaked by timed intermittent mistings and then drying were adhered to one another with resultant spoilage. In some instances, tags which survived the planting of the cuttings and the time spent during rooting tore off too easily in subsequent handling for gathering and packaging for shipment or sale because of moisture absorption. Tags nearly according to the present disclosure withstood these tests on a large scale testing in the winter-spring rooting season of 1967, but because 50 percent thicker than here preferred were found to be objectionably stiff. The proper plastic, fadeproof ink, the proper size hole, and a slit, properly located, which does not induce prematured tearing off, combine to accomplish the desired result.

Additional objects and advantages of the invention will be apparent from the description and from the drawings.

DESIGNATION OF FIGURES

FIG. 1 is a side view showing the tag of this invention applied to a cutting and illustrating its resistance to falling off;
FIG. 2 illustrates the position during planting;
FIG. 3 illustrates the condition after rooting, during the handling for packaging or shipping;
FIG. 4 is a plan view of a tag according to the present invention in the form preferred.

GENERAL DESCRIPTION

According to the present invention, a thin plastic tag 11 of the form shown in FIG. 4 is provided with a hole 12 which on the side extending toward the far end of the tag has a slit 13, preferably terminated by a rounded end 14 such as is provided by a smaller hole.

The stem 16 of a cutting 17 is inserted through the hole 12. If necessary, insertion is aided by the slit 13. This slit may be a simple knife cut, although spaced edges have been shown for clarity. The plastic has enough resilient strength so that if the slit is spread open in inserting the cutting 17, it immediately closes again. The hole size is snug enough about the stem 16 so that the tag, if not kept in the hand holding the cutting, will fall only to about the angle shown in FIG. 1 before in effect clamping itself to the stem by its cocked position.

At the same time, the tag is flexible enough so that it can be held in the position shown in FIG. 2 by the hand which is holding the cutting to insert it into a peg-formed hole 19 in rooting media 21. This will produce negligible bending effect on the stem. After roots 22 have grown from the stem, the rooted cutting can be lifted and the tag 11 is now secured to it with thorough reliability.

The purchaser is usually instructed to cut the tag off after planting (by cutting across the tag at the slit 13) so that it will not restrict the growth of the stem. It would also tear off without difficulty by grasping the tag at opposite sides of the slit with the two hands. Until the tags are willfully removed, each plant is reliably identified for the customer, as well as for the seller.

FURTHER DISCLOSURE OF BEST FORM CONTEMPLATED

The details are included, in this disclosure offered for public dissemination, to comply with the statutory requirement to set forth the best mode contemplated for carrying out the invention. These details are not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

It is extremely important that the material of which the tags 11 are made be wetproof as to durability, resilient strength, and nonadhesiveness when dried in contact with one another. One material known to be suitable is a plastic available as planished white vinyl. Before successfully trying this material, trials with numerous treated papers proved unsatisfactory. The cuttings are naturally rooted in close proximity to one another and on a large scale test with routine commercial handling of the plant the tags frequently lay across one another and would adhere to each other, and separation without spoilage was not practicable. Of course, it is possible that some other treated paper would meet the above wetproof requirement and would be satisfactory.

The correct strength, flexibility and resiliency is also important. Planished white vinyl in a thickness of .005 inch has this quality.

The ink used must be waterproof and fadeproof. Inasmuch as large numbers of labels with numerous varieties are printed, an inexpensive method of printing, such as offset, is preferred. Two inks suitable for offset printing and having the specified required characteristics are those available from Roberts & Porter, Inc. as Offset Holly Green 72–540 and Offset Christmas Red 72–250.

The size of aperture 12 will vary with different types of plants. For mum cuttings, a diameter of 5/32 of an inch has been found to be satisfactory.

For reasons of economy and for esthetic appropriateness, fairly small tags are preferred. A size of two inches by one-half inch has been found suitable with the hole size mentioned. It is important that the slit 13 extends lengthwise in the directional way from the end near the hole 12 so that the hole will not tear too easily in a direction toward one of the near edges of the tag. The small hole 14 is not essential, and in fact has not actually been tried. Tearing before shipment has not been excessive without it, but it is believed that premature tearing out by the customer will be decreased when this small aperture, or other rounding of the end of slit 13, is provided. Another alternative is to make the hole 14 of a usable size slightly different from that of hole 12. For example, if the aperture 14 is a little smaller than the aperture 12, when a stem is encountered which is substantially below average in diameter, it may be inserted in the smaller hole instead of the usual hole 12. Alternatively, the the aperture 14 may be made quite large and the customer can be instructed to slide the tag after planting until the stem is in the large hole, tearing off the tag only if the stem grows to a size at which it would be choked.

If such second usable hole is provided, the tag should be longer than two inches, because the tag should be very decidedly off balance on the stem, as with the hole centered at least five to seven times as far from one end as the other. The tags do not interfere in any way with the usual practices in rooting and shipping. For example, each cutting with its tag 11 applied thereto can be held in one hand while being dipped in rooting hormone and then inserted in a hole 19 formed in rooting media 21 by a pegged board commonly used for this purpose.

It is apparent from the foregoing that a very high degree of reliability has been achieved for satisfactory identification of individual cuttings from the time of cutting, through planting for rooting, through shipping and through customer handling and final planting.

We claim:

1. The method of propagating plants from cuttings with individual identification thereof through successive phases including inserting the stem of a freshly cut foliage-bearing cutting through a perforation in a variety tag of resiliently flexible nature, of a material wetproof as to durability, resilient strength, and nonadhesions when dried in contact with other such tags, the perforation in said tag fitting the stem of the cuttings snugly enough to prevent gravity-drooping of the tag to an angle with the upright stem more than about 50 degrees below the horizontal, the tag bearing variety identification of a wetproof and fadeproof nature, the perforation of the tag having a slit extending therefrom in a direction other than toward a nearby tag edge for facilitating insertion of the stem into the hole;

planting the cutting with a portion of the stem beyond the tag in rooting medium, growing roots on said planted stem portion; lifting the rooted cutting with the tag safely retained thereon by the roots, for issue of the individually tagged cutting to a grower.

2. The method of propagating plants from cuttings with individual identification according to claim 1 in which the tag through which the stem is inserted has the end of the slit remote from the perforation curved to resist tearing.

3. The method of propagating plants from cuttings with individual identification according to claim 1 in which the tag through which the stem is inserted has a second perforation connected to the first perforation by the slit, the two perforations being of different sizes.

4. The method of propagating plants from cuttings with individual identification thereof through successive phases including inserting the stem of a freshly cut foliage-bearing cutting through a perforation in a variety tag of resiliently flexible nature, of a material wetproof as to durability, resilient strength, and nonadhesions when dried in contact with other such tags, the tag bearing variety identification of a wetproof and fadeproof nature, the perforation of the tag having a slit extending therefrom in a direction other than toward a nearby tag edge for facilitating insertion of the stem into the perforation;

planting the cutting with a portion of the stem beyond the tag in rooting medium, growing roots on said planted stem portion; lifting the rooted cutting with the tag safely retained thereon by the roots, for issue of the individually tagged cutting to a grower.

5. The method of propagating plants from cuttings with individual identification thereof of cuttings through successive phases including inserting the stem of a freshly cut foliage-bearing cutting through a perforation in a variety tag of resiliently flexible nature as thin as about .005 inch, of a material wetproof as to durability, resilient strength, and nonadhesions when dried in contact with other such tags, the tag bearing variety identification of a wetproof and fadeproof nature, the perforation of the tag having a slit extending therefrom in a direction other than toward a nearby tag edge for facilitating insertion of the stem into the hole;

planting the cutting with the tag adjacent the foliage and substantially the entire stem in rooting medium while holding the tag in flexed condition to lie along the foliage, with the stem relatively unflexed, and after a growing period lifting the rooted cutting with the tag safely retained thereon by the roots, for issue of the individually tagged cutting to a grower.

References Cited

UNITED STATES PATENTS

| 2,538,927 | 1/1951 | Truitt | 40—315 |
| 2,642,684 | 6/1953 | Watts | 40—10 |
| 2,799,953 | 7/1957 | Sage | 40—10 |
| 2,981,990 | 5/1961 | Balderree | 40—2 XR |

ROBERT E. BAGWILL, Primary Examiner

U.S. Cl. X.R.

40—10